United States Patent [19]
Cap et al.

[11] Patent Number: 5,552,650
[45] Date of Patent: Sep. 3, 1996

[54] DISK STORAGE DEVICE WITH MOTOR WITH AXIALLY DEEP FLANGE

[75] Inventors: Heinrich Cap; Dieter Elsaesser, both of St. Georgen; Ulrich Koletzki, St. Georgen-Brigach; Georg Papst, St. Georgen, all of Germany

[73] Assignee: Papst Licensing GmbH, Spaichingen, Germany

[21] Appl. No.: 201,709

[22] Filed: Feb. 25, 1994

Related U.S. Application Data

[63] Continuation of Ser. No. 529,573, May 29, 1990, abandoned, which is a continuation-in-part of Ser. No. 364,036, Jun. 9, 1989, abandoned.

[30] Foreign Application Priority Data

Jun. 9, 1988 [DE] Germany ............................ 8807530 U
Jun. 9, 1989 [GB] United Kingdom ................... 8913364

[51] Int. Cl.$^6$ .................................................. H02K 7/00
[52] U.S. Cl. .......................... 310/67 R; 310/90; 310/156; 277/57; 360/99.08
[58] Field of Search ..................... 310/67 R, 43, 310/156, 45, 89, 179, 90, 180, 88, DIG. 6, 42, 254; 360/99.08, 99.12, 98.07; 384/480; 277/53, 55, 56, 57

[56] References Cited

U.S. PATENT DOCUMENTS

| | | | |
|---|---|---|---|
| 3,679,277 | 7/1972 | Dohmen | 310/90 |
| 3,922,590 | 11/1975 | Warren et al. | |
| 4,117,359 | 9/1978 | Wehde | 310/67 R |
| 4,519,010 | 5/1985 | Elsaesser et al. | |
| 4,535,373 | 8/1985 | Schuh | |
| 4,599,664 | 7/1986 | Schuh | 310/49 R |
| 4,658,312 | 4/1987 | Elsaesser et al. | |
| 4,698,542 | 10/1987 | Mueller | |
| 4,701,653 | 10/1987 | Merkle et al. | 360/99.08 |
| 4,760,298 | 7/1988 | Kitahara et al. | |
| 4,779,165 | 10/1988 | Elsaesser et al. | |
| 4,805,055 | 2/1989 | Wright | |
| 4,814,651 | 3/1989 | Elris et al. | |
| 4,837,474 | 6/1989 | Peterson et al. | |
| 4,843,500 | 7/1989 | Elasser et al. | 310/156 |
| 4,867,581 | 9/1989 | Schmidt et al. | 310/90 |
| 4,894,738 | 1/1990 | Elsaesser et al. | |
| 4,900,958 | 2/1990 | Kitahara et al. | |
| 4,965,476 | 10/1990 | Lin | |
| 4,996,613 | 2/1991 | Hishida | 360/99.08 |
| 5,006,943 | 4/1991 | Elsaesser et al. | |
| 5,128,819 | 7/1992 | Elsaesser | 310/156 |
| 5,157,295 | 10/1992 | Stefansky | 310/90 |
| 5,216,557 | 6/1993 | Elsaesser | 360/99.08 |
| 5,422,769 | 6/1995 | Elsaesser et al. | 360/99.08 |
| 5,424,887 | 6/1995 | Schuh | 360/98.07 |

FOREIGN PATENT DOCUMENTS

| | | |
|---|---|---|
| 0210835A2 | 2/1987 | European Pat. Off. . |
| 0291295A2 | 11/1988 | European Pat. Off. . |
| 227012A1 | 9/1985 | German Dem. Rep. . |
| 2319579 | 10/1973 | Germany . |
| 2225442 | 12/1973 | Germany . |
| 2325473 | 12/1974 | Germany . |

(List continued on next page.)

OTHER PUBLICATIONS

"Cold–Working Processes" by E. W. Ernst; p. 769 v 959; (No Month) Modern Asia Edition; Japan.

*Primary Examiner*—R. Skudy
*Attorney, Agent, or Firm*—Finnegan, Henderson, Farabow, Garrett & Dunner, L.L.P.

[57] ABSTRACT

A compact outer-rotor electric motor that can be used for directly driving a disk for recording and reproducing information has an axially deep, tank-form flange and a stationary shaft, upon which the mounting annulus of the flange and the ball bearings of the hub are axially displaced. The hub includes a cover disk for sealing an extremity of the ball bearings and an inverted cup shape rotor providing magnetic shielding. The flange includes a mounting rim substantially aligned with the back surface of the cup-shape rotor. The facing cup-like and tank-form shapes readily enable labyrinth seals, comprising seals of the lower bearings.

15 Claims, 1 Drawing Sheet

FOREIGN PATENT DOCUMENTS

| | | | |
|---|---|---|---|
| 2421379 | 11/1975 | Germany | 384/484 |
| 2645677A1 | 4/1977 | Germany. | |
| 2346380 | 1/1978 | Germany. | |
| 3135385A1 | 3/1983 | Germany. | |
| 3326543A1 | 1/1985 | Germany. | |
| 2314259 | 5/1988 | Germany. | |
| 53-55106 | 5/1978 | Japan. | |
| 62-64247 | 3/1987 | Japan. | |
| 63-859 | 1/1988 | Japan. | |
| 1262376 | 2/1972 | United Kingdom. | |
| 2162376 | 1/1986 | United Kingdom. | |
| 2218857 | 11/1989 | United Kingdom. | |
| 8503593 | 8/1985 | WIPO | 360/98.07 |

DISK STORAGE DEVICE WITH MOTOR WITH AXIALLY DEEP FLANGE

This application is a continuation of application Ser. No. 07/529,573, filed May 29, 1990, now abandoned, which was a continuation-in-part of application Ser. No. 07/364,036 filed Jun. 9, 1989, now abandoned.

BACKGROUND OF THE INVENTION

1. Field of the Invention

This invention relates to electric motors, especially those for directly driving rotary loads requiring "clean room" conditions, such as do many information storage disks.

2. Description of the Related Art

In the market for information storage disks, there is a continuing demand for compactness. Earlier, this demand was satisfied by external rotor motors, which could be axially relatively short. Now that demand is also directed toward an ever-diminishing diameter of information storage disks and of the apparatuses which hold them. At the same time, the motor must still supply adequate torque, have a certain minimum angular momentum and smooth-running operation, and inhibit the passage of dirt particles from its bearings and torque-generating regions toward a "clean room" region, all without increasing its overall axial dimension.

SUMMARY OF THE INVENTION

According to the invention, an electric motor including a rotor and a load bearing hub on which a disk can be driven, rotate about a central axis, comprises a flange for supporting a stator winding arranged about the central axis, a shaft mounted in the flange at the central axis and having an end extending beyond the flange; and the hub supported with respect to the shaft for rotary motion.

In an embodiment, the motor has a rotor external to and substantially surrounding the stator, and the flange has a base and a first annular portion extending axially from the base substantially throughout the axial extents of both the rotor and the stator to form a tank about the axis.

It is feature of the invention, that the axially-deepened tank form of the flange facilitates an offset mounting rim thereon that can be aligned essentially in the back plane of the rotor cup shape, thereby avoiding axial lengthening of the motor; while the offset mounting rim and rotor cup shape facing into the tank provide an approximation of an outer labyrinth seal for dust particles from the motor and provide superior magnetic shielding.

It is a further feature of a preferred embodiment of the invention that the use of a stationary shaft allows axial separation of, on the one hand, ball bearings supporting the hub and rotor and, on the other hand, the central annulus of the flange, rather than the prior art radial separation of them, thereby yielding a corresponding reduction in the diameter of the motor. Still other features of the preferred embodiment of the invention are related to the use of a stationary shaft, such the inner seals with respect to the bearings.

BRIEF DESCRIPTION OF THE DRAWING

Further features and advantages of the invention may be acquired from the following detailed description, taken together with the drawing, in which the sole FIGURE illustrates a preferred embodiment of the invention, shown as a section of half of the motor, which can serve as a drive unit, for example, as a hard disk storage drive.

DETAILED DESCRIPTION

Figure 1:
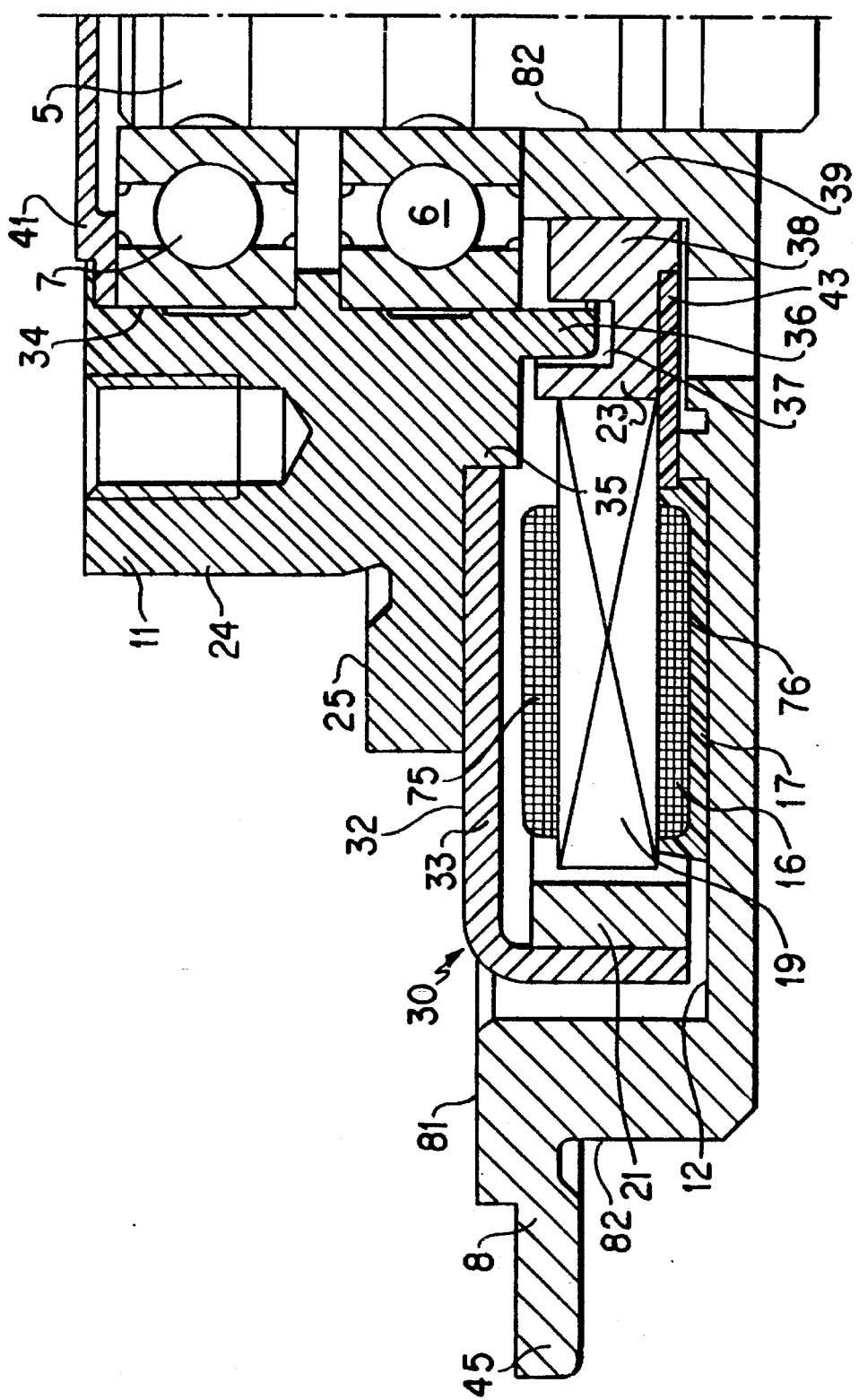

In the illustration of half of the motor 30, a rotor cup 33, deep-drawn out of soft iron sheet, surrounds a ring-type permanent magnet 21, and being attached to that magnet serves as the magnetic return path in a simultaneously-provided outer rotor housing, which has its cup-like opening facing toward the flange 8 shown below it, into which it axially projects. The flange 8 comprises a flange tank 82 and an outer rim 45. The flange tank 82 comprises a base 12, an axially-projecting extension 39, and an axially-projecting cylindrical portion terminating in a rim 81 which is offset from the rim 45. The rim 81 lies at about the same height as the extreme outside surface 32 which is the back plane or base of the rotor cup 33 of backplane 32. One end surface of the rotor magnet 21 terminates approximately at the edge of the cylindrical wall at the open end of the rotor cup 33. The opposite end surface of the rotor magnet 21 is spaced from the inner surface of the base of rotor cup 33 to terminate substantially opposite the corresponding end of the stator winding 16. The central stationary shaft 5 is in the center of the extension 39 of the flange tank firmly inserted. The shaft 5 bears at the same time, according to one embodiment of the electric motor 30, an axially separated arrangement of the ball bearings 6 and 7, the outer races of which are mounted at a predetermined axial spacing in the hub 11, which rotates with those around the motor axis, upon the stationary shaft 5. This hub 11 is a one-piece turntable part, for example composed of aluminum, that has a first shoulder 35 offset toward the flange 8; and, in the region of this first shoulder 35, the hub 11; is bonded on its axial underside to the rotor cup 33 at backplane 32, for example, by sputtering or gluing circumferentially. Rotor cup 33 is composed of iron.

The base surface of that rotor cup is strongly drawn radially inward to contact the first shoulders 35 so that that base surface yields at the same time a good magnetic shield for the disk chamber, where the magnetic information disks and the reading and recording heads are provided.

In this manner, one obtains a very compact arrangement with a stationary shaft. A cover disk 41 rotates with the hub 11, in that it is itself the upper axial termination. Thus over the upper axial ball bearing 7, it is bonded to hub 11. Therefore, a flawless seal of the upper ball bearing away from the clean room of the disk chamber is also supplied. Under the lower ball bearing 6 and also within the space inside of the rotor cup 33 there is provided a labyrinth seal comprising projections from the hub 11 and the flange 8. The projection 36 from the hub 11 is called the rotor-side projection; and the projections from the flange, actually from an annular part fitted around the extension 39 of the flange, are projections 23 and 38, which are called the stator-side projections. Therebetween is the groove 37 into which the projection 36 reaches. A U-shaped gap defined between the projection 36 and the annular groove 37 is an effective labyrinth seal. The projections 23 and 38 are supported on the outer surface of the extension 39 or on the flange base 12. The central stationary shaft 5 is held in the motor flange tank 82 in the central bore of the extension 39. The hub 11 serves thus simultaneously to bear at least one disk on its outer cylindrical load bearing surface 24 and upon a flat added shoulder 25 and for the support of the cover disk 41 that rotates with it over the upper bearing 7. Between the labyrinth seal and the cover disk 41 lie axially in respective pairs of races the two ball bearings 6 and 7.

On the hub-like extension 39 in the middle of flange 8, which holds the, for example, press-fit stationary shaft, the inner stator is set over the annular part of projection 23 (including the axial groove) to the outer surface of which it is fastened, for example, by means of glue. The stator comprises stator laminations 19 and stator windings 16 having extremities 75 and 76. The stator laminations 19 comprise a grooved stack of sheets. The mounting of the stator can also be accomplished through the injection of the entire stator block together with the flange tank 82 filling the gap 17 between the base 12 of the flange and the windings 16. Thereby the outer extremities 75, 76 of the stator windings can be overlaid with a casting resin seal, so that one need fear no dirt particles out of the region of the stator winding 16 in the clean room, because this casting resin is injected in the crucial places well and compactly.

The flange tank 82 has at its extreme outer edge a radial projection or rim 45, through which the motor 30 is fastened in a disk information storage apparatus. In general, this rim 45 will be screwed together with the lower wall of the clean room.

The concept of this axial integration of a direct-driving outer rotor motor (with cylindrical air gap) and load-bearing hub makes possible the full use in the hub of the motor of the radially intermediate space between the preferably stationary shaft and the cylindrical hub wall of the arrangement for bearings and seals, which can also occupy the entire available axial space reaching to the axial position of the adjacent motor region at the central portion of flange 8. It is readily seen that the mounting flange comprises a cup-shaped flange having an axially-extending recess therein, into which the oppositely-oriented rotor cup 33 projects.

The diametral measurement of the cylindrical air gap is not dependent upon the hub diameter. Thereby, the stator also becomes more annular, because the inner stator is shifted radially away from the shaft axis. Radially therebetween lie the axial projections from both the rotor and stator sides which are axially annularly interdigitated among one another for rotary motion (which could also be a larger number of ridge-like projections) and also in this near-shaft region lies the cover which covers the bearing space to separate it from the clean room, and well as both arrangements separating the inner motor space from the clean room.

This radially intermediate space between the central shaft and its support and the inner surface of the stator annulus is available because one does not need a radially wider electromagnetic field with a large air gap diameter for the stator annulus, that is, the laminated stator magnetic stock.

This concept has the advantage that an increased momentum requirement is producible (achievable because the air gap can be kept larger, in any case not dependent upon hub diameter, which must be ruled by the standardization requirements for information storage disks). Since the tendency is toward ever-smaller disks, output drive diameter also tends to be smaller, so that the power requirements for a drive motor placed in the hub is set at pre-existing limits.

Through the above-described concept the radial moment arm of the air gap of an outer rotor motor may be increased as desired, practically at will, through radial enlargement of the flange tank, that is to say of the axially deepened flange configuration. The deepening of the flange configuration in itself permits an radial compactness because the bearings 6, 7 and axial extension 39 are axially, rather than radially aligned. The shaft has a first axial length upon which bearings 6 and 7 are mounted, and a second axial length upon which extension 39 is mounted, comprising the whole length of the shaft 5.

The rotor cup 33 in the motor housing offers at the same time a relatively good magnetic shielding, since it serves at the same time as the magnetic return path, making it essentially thicker than needed for magnetic shielding.

In this way, all of the space between the outer surface of the stationary shaft and the inner wall of the hub for the output system is put to good use.

If the outer hub diameter must become smaller, because of the ever-diminishing diameter of the information storage disks, and therewith also a diminishing size above a minimum size of a central hole must be set, there is virtually no alternative to the one-piece hub 11 as described above, to be made out of low-remanence magnetic material.

On the base 12 on the flange tank, a circuit board 43 with a printed circuit thereon is illustratively supplied, which also can constitute a portion of the connection of the stator-side casting resin seal. The motor thus provided, which boasts a large ratio of air gap diametrical dimension to axial length, is, for example, a brushless outer rotor motor with three strings provided for a three-or-six pulse drive, or for a two- or one-pulse drive provided, such as that described in the following patent documents DE-OS 22 25 442; (Offenlegungsschrift) and DE-PS 23 46 380 and/or DE-PS 23 14 259.

We claim:

1. A drive motor for a disk storage device including an outer rotor which directly drives a hub for mounting one or a plurality of information disks, comprising:

a mounting flange around an axis, the flange having a base and an annular portion extending axially from the base to form a tank about the axis, the flange including a mounting rim outside the annular portion with a radial projection for mounting and with a raised rim;

a shaft mounted centrally in said flange;

the hub mounted for rotation about said shaft and having an axial underside;

the outer rotor including a rotor cup of magnetic material facing into the tank of the flange, having a backplane with a substantial radial length, and being fixed to the axial underside of the hub throughout a portion of the backplane;

said raised rim of said mounting flange being aligned essentially in the backplane of the rotor cup;

a stator within the tank and within limits of the outer rotor; and the hub having an outer surface of non-magnetic material, said outer surface having an axially extending section and a radially-extending planar section for mounting the one information disk or the plurality of information disks.

2. The drive motor of claim 1, in which:

the outer rotor includes permanent magnetic elements mounted in the rotor cup surrounding the stator and separated therefrom by a cylindrical air gap, said rotor cup of magnetic material and permanent magnet elements effectively shielding the annular portion of the flange from the stator.

3. The drive motor of claim 1, in which the shaft is fixedly mounted to the flange, the hub being mounted on the shaft by a plurality of bearings;

the hub including a central cover plate rotating therewith for sealing the bearings from the outer load-bearing surface; and further comprising a labyrinth seal between the bearings and the stator.

4. The drive motor of claim 3, in which
the labyrinth seal includes elements radially inside of the stator and axially offset from a nearer one of the bearings toward the flange.

5. The drive motor of claim 4, in which
the hub is of aluminum, the backplane of said rotor cup of magnetic material being held firmly to the axial underside of the aluminum hub.

6. The drive motor of claim 4, in which the shaft has first and second approximately comparable axial length comprising substantially its whole length, the first axial length being a length of a portion of the shaft mounted in the flange and said second axial length being a length of the shaft upon which the bearings are mounted and which is substantially occupied thereby, the flange having a second portion adjacent the shaft extending from the base axially throughout the first axial length.

7. The drive motor of claim 1, including a plurality of bearings, and a labyrinth seal between the bearings and the stator.

8. The drive motor of claim 1, in which the hub is of aluminum, the backplane of said rotor cup of magnetic material being held firmly to the axial underside of the aluminum hub.

9. The drive motor of claim 2, in which the hub is of aluminum, said rotor cup of magnetic material being held firmly to the axial underside of the aluminum hub, which axial underside is aligned essentially with the raised rim.

10. The drive motor of claim 3, in which the hub is of aluminum, said rotor cup of magnetic material being held firmly to the axial underside of the aluminum hub, which axially underside is aligned essentially with the raised rim.

11. The drive motor of claim 3, in which the shaft has approximately comparable first axial length and second axial length comprising substantially its whole length, the first axial length being a length of the shaft mounted in the flange and said second axial length being the length of the shaft upon which the bearings are mounted and which is substantially occupied thereby, the flange having a portion adjacent the shaft extending from the base axially throughout the first axial length.

12. The drive motor of claim 7, in which the hub is of aluminum.

13. The drive motor of claim 7, in which the shaft has first and second approximately comparable axial lengths, the first axial length being a length of the shaft mounted in the flange and said second axial length being a length of the shaft upon which the bearings are mounted and which is substantially occupied thereby, the flange having a second portion adjacent the shaft extending from the base axially throughout the first axial length.

14. The drive motor of claim 2, in which the hub of aluminum and the rotor cup is of deep-drawn soft iron sheet.

15. The drive motor of claim 1, wherein the rotor cup is fixed to the hub throughout the portion of the backplane, which portion has a radial length that is a major fraction of the substantial radial length of the backplane.

* * * * *

UNITED STATES PATENT AND TRADEMARK OFFICE
CERTIFICATE OF CORRECTION

PATENT NO. : 5,552,650
DATED : September 3, 1996
INVENTOR(S) : Heinrich CAP, Ulrich KOLETSKI, Georg PAPST It is certified that error appears in the above-indentified patent and that said Letters Patent is hereby corrected as shown below:

Claim 10, column 6, line 4, "axially" should read --axial--.

Claim 14, column 6, line 23, after "hub", insert --is--.

Title page, column 1, under "Inventors", lines 2-3, after "Ulrich Koletzki," delete "St Georgen-Brigach" and insert therefor --Tennenbronn--.

Signed and Sealed this

Third Day of December, 1996

Attest:

BRUCE LEHMAN

*Attesting Officer*  *Commissioner of Patents and Trademarks*